L. E. GERRISH.
BRACKET FOR VEHICLE LAMPS.
APPLICATION FILED APR. 29, 1914.
1,128,127.
Patented Feb. 9, 1915.
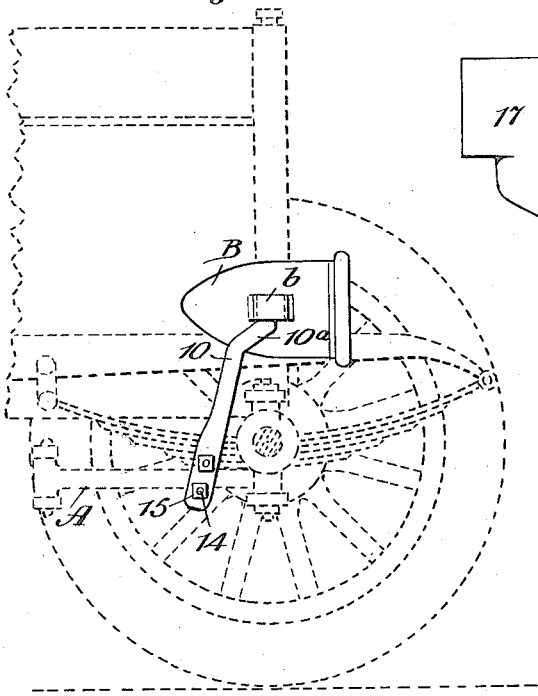
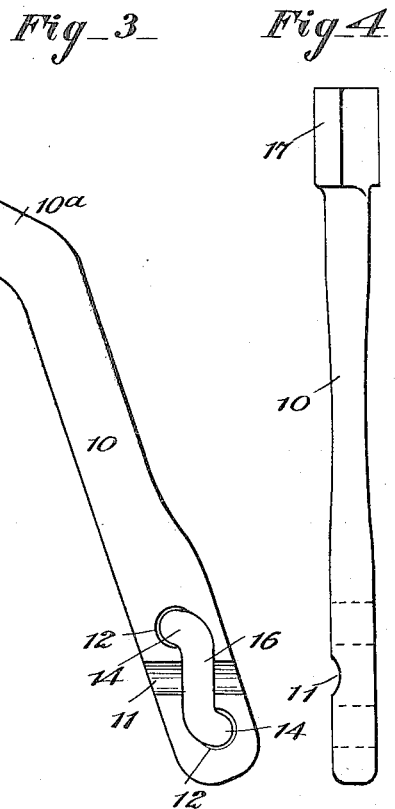
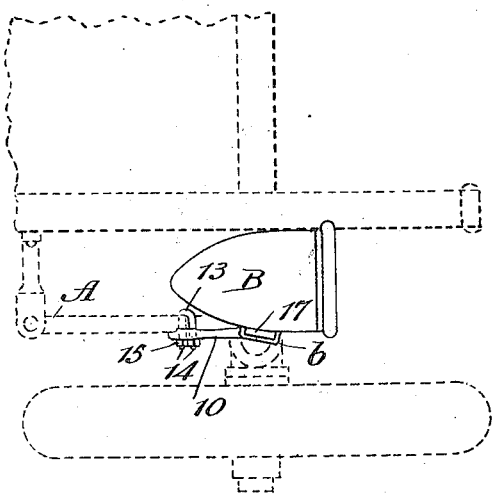
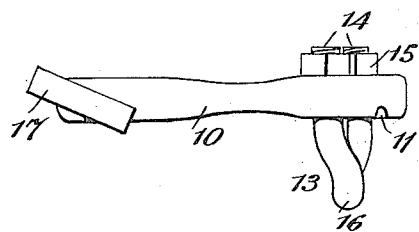
WITNESSES
Frank C. Palmer.
INVENTOR
Lloyd E. Gerrish
BY
ATTORNEYS

UNITED STATES PATENT OFFICE.

LLOYD E. GERRISH, OF EAST LEBANON, MAINE.

BRACKET FOR VEHICLE-LAMPS.

1,128,127. Specification of Letters Patent. Patented Feb. 9, 1915.

Application filed April 29, 1914. Serial No. 835,150.

*To all whom it may concern:*

Be it known that I, LLOYD E. GERRISH, a citizen of the United States, and a resident of East Lebanon, in the county of York and State of Maine, have invented a new and Improved Bracket for Vehicle-Lamps, of which the following is a full, clear, and exact description.

The invention relates to automobile lamps adapted to be mounted at either side of the vehicle, and more particularly the invention relates to the type of lamp having a loop at one side only, the loop being disposed when the lamp is in place, at that side toward the center of the vehicle, the lamp being bodily turned on its axis through 180°, according to whether the lamp is to be mounted at the right or left side.

My invention provides a bracket comprising a standard having novel means at its lower end to engage the arm of the steering knuckle so as to dispose the standard at an upward and forward inclination, the upper end of the standard being formed with a head and positioned so as to receive the loop on the lamp whether the latter be at the right or left of the vehicle.

The invention will be particularly explained in the specific description following.

Reference is to be had to the accompanying drawings forming a part of this specification, in which similar characters of reference indicate corresponding parts in all the views.

Figure 1 is a side elevation showing my improved bracket in use; Fig. 2 is a plan view thereof; Fig. 3 is an enlarged side elevation of the bracket; Fig. 4 is an edge view thereof; and Fig. 5 is a plan view.

The improved bracket comprises a standard 10, adjacent to the lower end of which is an oblique concave depression or groove 11, in a face of the bracket, the obliquity being such as to receive the horizontal arm or bar A, attached to the steering knuckle of the vehicle, and dispose the standard 10 at an upward and forward inclination whereby to sustain and position the lamp B, by engaging the said loop $b$ in the manner hereinafter explained.

To clamp the bracket on the knuckle bar A, a U-shaped clip is employed and designated generally by the numeral 13. The arms 14 of the clip extend transversely through holes 12 in the bracket 10, said holes being in alinement with each other, and located respectively above and below the depression 11. Nuts 15 on the threaded ends of the arms bind the clip in place. It will be observed from Figs. 3 and 5, that the U-bend 16 of the clip has a twist disposing said bend at such an angle to the arms 14 of the clip that the bend will cross the depression 11 and the knuckle bar A at substantially right angles. The tightening of the nuts 15 will then sustain the bracket rigidly in position on the knuckle bar A.

To engage the loop $b$ of a lamp, a preferably rectangular head 17 is formed on the upper end of the standard 10, the said bracket being offset forwardly as at $10^a$, and the head 17 being disposed vertically. It will be observed also, that the head 17 is oblique to the general plane of the standard, whereby to cause the head to conform to the general exterior lines of the lamp B.

By the described construction the bracket is applicable to either side of the vehicle, and the lamp B of the type illustrated, is the same for either side, and the loop $b$ of the lamp is positioned at the inside by turning the lamp bodily on its axis through 180°.

Having thus described my invention, I claim as new and desire to secure by Letters Patent:

1. A bracket for automobile lamps, comprising a standard having an obliquely disposed concave depression to receive the arm of a steering knuckle, and having transverse holes respectively above and below said depressions and in alinement with each other on the axial line of the standard, a U-shaped clip, the shanks of which extend through said holes, the U-bend of said clip having a twist disposing said bend at an angle substantially normal to the oblique depression. and a head adapted to engage a lamp loop, said head being disposed in a plane at an angle to the plane of the standard.

2. A bracket for automobile lamps, comprising a standard having means at its lower end to secure the standard at an inclined position on the arm of a steering knuckle and having a head at its upper end to engage the side loop of a lamp, said head being disposed in a plane at an angle to the general plane of the standard.

3. A bracket for automobile lamps, comprising a standard having a head to engage the side loop of a lamp, and means to secure the standard at its lower end to the arm of a steering knuckle, said means comprising an obliquely disposed concave depression to receive the arm of the steering knuckle, and transverse holes in the bracket respectively above and below the said depressions and in alinement with each other, a U-shaped clip, the shanks of which extend through said holes, and nuts on said shanks, the U-bend of the clip having a twist disposing said bend at substantially a right angle to the oblique depression.

In testimony whereof I have signed my name to this specification in the presence of two subscribing witnesses.

LLOYD E. GERRISH.

Witnesses:
STEPHEN D. LORD,
MARY A. GOODWIN.

Copies of this patent may be obtained for five cents each, by addressing the "Commissioner of Patents, Washington, D. C."